United States Patent [19]

Audsley

[11] Patent Number: 4,929,403
[45] Date of Patent: May 29, 1990

[54] PROCESS FOR FORMING MULTI-LAYER FLEXIBLE MOLDS

[76] Inventor: Edwin F. Audsley, c/o Chem-Form, Inc., 18 W. Windermere Ter., Landsdowne, Pa. 19050

[21] Appl. No.: 385,007

[22] Filed: Jul. 25, 1989

[51] Int. Cl.$^5$ .................... B29C 35/08; B29C 41/22
[52] U.S. Cl. ........................ 264/22; 264/78; 264/129; 264/137; 264/220; 264/225; 264/226; 264/227; 264/236; 264/255; 264/257; 264/294; 264/308; 522/90; 522/97; 522/102; 522/106; 522/158; 522/176; 522/180; 522/181; 522/182; 524/296; 524/847
[58] Field of Search ............... 264/22, 78, 129, 137, 264/219, 220, 221, 225, 226, 227, 236, 255, 257, 294, 308, 317; 427/44, 54.1, 385.5, 393.5, 407.1; 522/90, 97, 102, 106, 158, 176, 180, 181, 182; 524/296, 847

[56] References Cited

U.S. PATENT DOCUMENTS

| | | | |
|---|---|---|---|
| 2,448,828 | 9/1948 | Renfrew | 522/13 |
| 2,525,664 | 10/1950 | Gadsby | 522/182 X |
| 3,030,329 | 4/1962 | Warnsdorfer | 523/453 |
| 3,239,226 | 3/1966 | Trimble | 264/226 |
| 3,388,203 | 6/1968 | Meininger et al. | 264/225 |
| 3,427,689 | 2/1969 | Windecker | 264/219 X |
| 3,551,235 | 12/1970 | Bassemir | 522/181 X |
| 3,551,311 | 12/1970 | Naos | 522/181 X |
| 3,661,576 | 5/1972 | Crary | 430/288 |
| 3,719,522 | 3/1973 | Johnson | 427/44 |
| 3,773,706 | 11/1973 | Dunn, Jr. | 528/62 |
| 3,989,790 | 11/1976 | Bruner et al. | 264/225 |
| 4,042,654 | 8/1977 | Leszyk | 264/22 |
| 4,073,835 | 2/1978 | Otsuki | 264/22 |
| 4,107,245 | 8/1978 | Jansson | 264/78 X |
| 4,233,396 | 11/1980 | Armstrong et al. | 264/22 X |
| 4,421,782 | 12/1983 | Bolgiano et al. | 427/54.1 X |
| 4,752,498 | 3/1987 | Fuduim | 427/54.1 |
| 4,776,992 | 10/1988 | Irving et al. | 264/22 |

OTHER PUBLICATIONS

Morton Thiokol, "Uvithane 782 Oligomer".
C. P. Herz, et al., "Curing by UV Radiation", Kontakte reprint.
J. Hern, et al., "Improved Technology in UV Coatings and Curing Agents," Modern Paint and Coatings (8/80) pp. 1-6.
Nobel & Westbrook, "Noblewest Durolastic Tooling," product bulletin.
Smooth-On Manufacturing Co., "Polymer Formulations for Production Bonding", pp. 1-4.
Smooth-On, Inc., "PMC-724", product bulletin.
Anonymous, "Liquid Rubber Compound Boosts Mold (p.6) Production," IMP-Industrial Models & Patts., Jan-Feb. 1975.
Acronium Speciality Alloys, "Fusible Alloys," pp. 1-4.
T. Feeley et al., "Making Models with Light," American Jewelry Mfg. (Nov. 1986) pp. 30-33.
Castaldo, Catalog, pp. 14-16, 67-68.
R. B. Platt, "A New Method of Metal Casting: Cold Casting with Epoxy and Metal Powers,".
Loctite Corp., "Loctite's Nuva-Sil,".
Aremco Products, Inc., "EZ-Cast" 521 Plastic Molding Compound.
Petrarch Systems, Inc., "Thin Film Silicone Coatings" product brochure.
Tekcast Industries, Inc. Product Brochure G-1-018730.
Agietron Corp., "Agiecut" product brochure.
Sartomer Company, product bulletin Sartomer 9503-9504-9505.

Primary Examiner—Jeffery Thurlow
Assistant Examiner—Leo B. Tentoni
Attorney, Agent, or Firm—Paul & Paul

[57] ABSTRACT

A process for rapidly forming a flexible mold for finely detailed objects from a radiatively curable molding composition includes coating at least a portion of the surface of a three-dimensional object with a fluid molding composition. The coating is cured by exposing the fluid coating to radiative energy to form an elastic, flexible layer of cured molding composition on the object. The coating and curing steps can be repeated to build up the flexible mold until a predetermined minimum has been attained. The cured molding composition is removed from the object, and is suitable for immediate use as a mold to cast duplicate reproductions of the object.

21 Claims, No Drawings

PROCESS FOR FORMING MULTI-LAYER FLEXIBLE MOLDS

BACKGROUND OF THE INVENTION

1. Field of the Invention

The present invention relates to a process and a composition for forming flexible molds for finely detailed objects, to the molds produced thereby, and to a process for using the molds produced to cast such objects.

2. Brief Description of the Prior Art

Flexible molds for finely detailed objects are produced by two principal prior art processes.

A method widely used in the jewelry industry requires a three-dimensional model made of metal. The model is placed between sheets of a solid but unvulcanized rubber composition and heat and pressure are applied to embed the model in the rubber sheets and to vulcanize the rubber. A skilled craftsman carefully cuts apart the resulting block of opaque rubber surrounding the model to produce a two-piece flexible mold. This mold is then held together between metal plates, and wax is injected into a sprue opening to make duplicate waxes for the "lost wax" or investment casting of jewelry.

Other industries working with small models often use polymeric silicone compositions for casting flexible molds. Silicone molding compositions are usually two-part materials which must be mixed immediately before the mold is to be made. Both RTV ("room temperature vulcanizing") and elevated temperature cure formulations are available. Another type of two-part molding composition sometimes used is based on urethane cure chemistry. The use of two-part compositions requires measuring out catalyst and an uncured polymer composition in precise proportions and careful but thorough mixing. A vacuum source is often used to remove air bubbles entrained by the mixing. A two-piece mold can be made sequentially. However, the first piece of the mold must be completely cured before the second piece of the mold can be cast. Thus, from about 24 to 72 hours may be required to finish a mold. Alternatively, an elevated temperature cure material can be employed to encapsulate the model and the cured mold has to be carefully cut apart.

The use of radiant energy to cure compositions including ethylenically unsaturated components is well known. Typically, the radiation curable composition includes a component which is activated by the radiation and provides a free radical species. The free radical species initiates the reaction of the ethylenically unsaturated components of the composition. Often the cure entails the free radical-induced polymerization of ethylenically unsaturated monomers. Commonly, a high energy source of radiant energy is used, such as an ultraviolet (uv) lamp.

Most radiant energy-curable compositions are used to provide relatively thin coatings or layers of cured material. Common examples are uv-curable photoresists (such as disclosed, for example, in U.S. Pat. No. 3,661,576), printing inks (such as disclosed, for example, in U.S. Pat. Nos. 3,551,235 and 3,551,311), protective coatings for metal sheets and foils, glass, shaped polymeric solids (such as disclosed, for example in U.S. Pat. No. 3,719,522), wood veneer, plywood, chipboard, paper, cardboard, and the like, optical coatings for photographic film, and high gloss finish coatings. These coatings frequently include components which absorb or scatter uv radiation, and thus must be applied in a thin enough layer so that the entire thickness is effectively cured, or a second, usually thermal, step must be undertaken to complete the cure of the coating, as discussed in U.S. Pat. No. 4,073,835.

Radiative cure of a fluid composition to form three-dimensional objects is disclosed in U.S. Pat. No. 4,752,498, which relates to the use of a patterned "negative" to modulate the transmission of uv radiation. The more opaque portions of negative transmit less uv radiation, and the curable composition is disclosed to be cured to a lesser depth, presumably because the uv radiation effectively penetrates to a lesser depth. This "selective solidification" provides three-dimensional objects useful as printed circuit boards, and which can be metallized in a subsequent step. It is unclear how a clear demarcation between the surface of three-dimensional object and the sol fraction formed immediately adjacent thereto is provided. U.S. Pat. No. 2,525,664 similarly discloses varying the flux of radiation impinging on a fluid casting composition using a screen, but the goal here is to eliminate small voids and internal strains occurring when optical component castings are uniformly irradiated.

U.S. Pat. No. 4,042,654 relates to the radiative cure of thin plastic parts which are cast from a resin composition having sufficient viscosity such that the shape of the casting is retained, even in the absence of a mold, long enough for the casting to be radiatively cured.

A great variety of radiatively curable materials are known, including monomers and low-to-moderate molecular weight polymers (oligomers). Often a radiatively curable composition for surface coatings will include an oligomer component having one or more reactive sites and a reactive diluent component comprising one or more monomeric species. For example, U.S. Pat. No. 4,421,782 discloses a coating composition for floor tiles comprising about one-third reactive diluent and two-thirds acrylate-capped urethane prepolymer (Example I). Surface coatings prepared using such compositions are typically highly crosslinked. These high modulus, tough coatings simulate the performance previously obtainable only by environmentally unsound solvent-based coating compositions and coil coatings cured at at elevated temperature.

While there are a number of known materials and processes for preparing flexible molds for casting finely detailed three-dimensional objects, such as jewelry, objects d'art, and the like, there remains a need for a process which quickly provides a flexible mold for such objects. Further, there is a need for a process for preparing flexible molds which can be used immediately after preparation for molding reproductions of the model used. Similarly, there is a need for a molding process which can be readily employed by semi-skilled professional and amateur workers to quickly and accurately reproduce finely detailed three-dimensional objects.

SUMMARY OF THE INVENTION

The present invention provides a process for forming a flexible mold for finely detailed objects from a radiatively curable molding composition. The process of the present invention quickly provides flexible molds for finely detailed three-dimensional objects for all types of mold making. In contrast to many prior art methods, the present process can be used by semi-skilled professional workers and amateurs to consistently prepare useful flexible molds. The molds so produced can be used immediately to cast reproductions of the original model in various media such as wax, plastic, fusible alloys, ceramic clays, plaster, and the like. Wax reproductions can be used in the lost wax or investment casting process to produce faithful reproductions of the original in other media, such as precious metals.

The process of the present invention includes coating at least a portion of the surface of a three-dimensional object with a fluid molding composition which is radiatively curable. Preferably, at least a predetermined thickness of the initial fluid molding composition is applied. The coating is cured by exposing the fluid coating to radiative energy for at least a period effective to form an elastic, flexible layer of cured molding composition on the three-dimensional object or model. It is desirable to repeat the coating and curing steps to build up the flexible mold until a predetermined minimum thickness has been attained, before the three-dimensional object is removed from the elastic, flexible mold.

In a presently preferred embodiment of the process of the invention, the predetermined thickness of the initial layer is about one millimeter, and the predetermined minimum thickness of the built-up multilayer of cured molding composition is about 3–4 millimeters.

Preferably, the fluid molding composition is transparent or translucent, thereby facilitating inspection of the three-dimensional object coated with the fluid molding composition to determine whether air bubbles have been entrapped at the interface between the three-dimensional object and the fluid molding composition before curing the mold. In addition, the radiatively curable fluid molding composition preferably includes an indicator which changes color to signal the depth of penetration of the radiation into the molding composition, and to facilitate distinguishing cured core layers from an uncured outer coating of the fluid molding composition during application.

The radiatively curable fluid molding composition preferably includes at least one (meth)acrylate-capped, crosslinkable oligomer, at least one reactive diluent, and at least one photoinitiator. In addition, the fluid molding composition preferably comprises at least one thixotrope, such as fumed silica.

The oligomer is preferably selected from (meth)acrylate-capped epoxy oligomers, (meth)acrylate-capped polyether oligomers, (meth)acrylate-capped polyester oligomers, (meth)acrylate-capped polybutadiene, (meth)acrylate-capped polychloroprene, (meth)acrylate-capped polyester urethane oligomers, (meth)acrylate-capped polybutadiene oligomers, (meth)acrylate-capped nylon oligomers, (meth)acrylate-capped polysulfide oligomers, (meth)acrylated polybutadiene oligomers, and polychloroprene oligomers. It is preferred that the at least one oligomer is an (meth)acrylate-capped oligomer having an average (meth)acrylate functionality of about two.

In a presently preferred embodiment the at least one oligomer is an acrylate-capped polyester urethane oligomer having a number-average molecular weight of about 5000. In the same presently preferred embodiment, the at least one reactive diluent includes a monoethylenically unsaturated monomer copolymerizable with the at least one crosslinkable oligomer, the monoethylenically unsaturated monomer preferably being N-vinyl pyrrolidone. The fluid molding composition additionally preferably comprises at least one plasticizer for the crosslinkable oligomer. In a presently preferred embodiment the at least one plasticizer includes butyl benzyl phthalate and/or polycaprolactone triol.

Advantageously, the process of the present invention permits molds to be made from originals or models formed from heat-sensitive materials, because the presently preferred fluid molding compositions are curable without a perceptible exotherm. In addition, the preferred molding compositions give cured molds which are elastic and exhibit low shrinkage.

DETAILED DESCRIPTION

The present invention provides a process for forming a flexible mold from a radiatively curable molding composition. The type and intensity of the radiative energy employed are adapted to the cure characteristics of the curable molding composition. In a presently preferred embodiment, the curable composition is curable on exposure to ultraviolet radiation, and many uv radiation sources known in the art can be used to effect the cure. Examples of uv radiation sources include lasers; ultraviolet lamps and tubes, including xenon illuminators, quartz arc lamps, incandescent lamps, high, low and medium pressure mercury arc lamps, carbon arc lamps, and swirl-flow arc sources; and daylight. However, other types of radiative cure can be accomplished by suitably compounding the molding composition, as by the choice of a photoinitiator sensitive to the characteristic wavelength of the radiation emanating from the radiation source of choice. For example, under suitable conditions, incandescent lamps can by used. As used in the present specification and claims, "radiative cure" includes cure by energetic particle beams, such as electron and positron beams and the like. When a suitably energetic particle beam is used, the photoinitiator can be omitted.

The radiatively curable molding composition of the present invention is preferably sensitized to the applied radiation by including at least one photoinitiator in the molding composition, the photoinitiator being sensitive to the applied radiation. Preferably, the photoinitiator functions as a source of free radical species, which initiate the addition polymerization of ethylenically unsaturated components of the molding composition. Free radical-generating photoinitiators are well known in the polymerization arts, and the type and amount suitable for a specific curable molding composition of the present invention can be determined readily by one of ordinary skill in the art by experiment. Typically, photoinitiator is used in an amount comprising from about 0.1 to 10 percent by weight of the amount of photopolymerizable components of the molding composition. Examples of suitable photoinitiators include benzophenone, acetophenone and substituted acetophenones such as diethoxyacetophenone, 2-, 3-, and 4-alkyl- and 2-, 3-, and 4-alkoxyacetophenones such as 3-methylacetophenone and 2-methoxyacetophenone, and 2,2'-dimethoxyacetophenone, 2,2'-dimethoxy-2-phenyl-acetophenone, 2,2'-dimethyl-2-hydroxyacetophenone, phenylacetophenone, fluorene and fluorenone, carbazole, anthraquinone and substituted anthraquinones, xanthone and substituted xanthones such as thioxanthone and 2-, and 3-chloroxanthone, benzaldehyde, triphenylamine, benzoin alkyl ethers such as benzoin methyl ether and benzoin butyl ether, and the like. In a presently preferred embodiment of the molding composition of the present invention, the preferred photoinitiator is 2-hydroxy-2-methyl-1-phenylpropan-1-one, available commercially from EM Chemicals Corporation of Elmsford, N.Y. under the tradename Darocure ™ 1173.

The radiatively curable composition of the present invention preferably includes at least one (meth)acrylate-capped (or "(meth)acrylated") oligomer, although suitable oligomers which are not (meth)acrylate-capped can also be used. By "oligomer" is meant a low to medium average molecular weight linear or branched polymer having a molecular weight distribution substantially free of species having a molecular weight sufficiently high to effect increased viscosity through entanglement coupling between chains. By "(meth)acrylate-capping" is meant one or more ends of the oligomer has been reacted to provide an acryl-functional (—O—C(O)—CH=CH$_2$) chain end or a methacryl-functional (—O—C(O)—CH(CH$_3$)=CH$_2$) chain end. Examples of other suitable reactive terminal groups for oligomers for use in the present invention include vinyl groups and allyl groups. In general, the oligomer preferably includes at least one terminal group which is reactive in the sense of being polymerizable by free radical polymerization.

(Meth)acrylate-capped oligomers are well known in the surface coating arts. Suitable (meth)acrylate-capped oligomers include (meth)acrylate-capped epoxy oligomers, (meth)acrylate-capped polyether oligomers, (meth)acrylate-capped urethane oligomers, (meth)acrylate-capped polyester oligomers, (meth)acrylate-capped polybutadiene oligomers, (meth)acrylate-capped polychloroprene oligomers, (meth)acrylate-capped polyester urethane oligomers, (meth)acrylate-capped nylon oligomers, and (meth)acrylate-capped polysulfide oligomers. Other oligomers which can be used include (meth)acrylated polybutadiene oligomers and polychloroprene oligomers.

In a presently preferred embodiment of the molding compound of the present invention, an acrylate-capped polyester urethane oligomer is employed, available commercially from Morton Thiokol, Inc. under the tradename Uvithane ® 782. This oligomer is believed to have a number average molecular weight of about 5000 and an average acrylate functionality of about two. In another presently preferred embodiment of the present invention, another oligomeric urethane diacrylate, having a molecular weight of about 2000 and commercially available from Sartomer Company, West Chester, Pa., under the tradename Sartomer 9503 Monomer, is employed.

In another presently preferred embodiment of the present invention, an acrylated polybutadiene oligomer is used in a mixture with an acrylate-capped polyester urethane oligomer. The acrylated polybutadiene oligomer is available from Colorado Chemical Specialties, Inc. Golden, Colo., under the tradename Ricon ® PBD-acrylated, and has a molecular weight of up to 30,000. This oligomer has an acrylate content of about 4.5 percent by weight, a viscosity of about 5000–10,000 centipoise at 25° C., a 1,2 vinyl content of about 23 percent, a trans 1,4 vinyl content of about 51 percent, and a cis 1,4 vinyl content of about 26 percent. The acrylated polybutadiene oligomer can be prepared using conventional methods from the non-acrylated oligomer by oxidizing pendent vinyl groups on the polybutadiene oligomer to provide pendent epoxy groups, and subsequently reacting the pendent epoxy groups with acrylic acid, or by the addition of acrylic acid, or other unsaturated acids to the pendent double bonds using an acid catalyst.

Other types of oligomers which can be used in the process of the present invention include allyl-capped epoxy oligomers, allyl-capped polyether oligomers, allyl-capped urethane oligomers, allyl-capped polyether oligomers, allyl-capped polyester oligomers, allyl-capped polybutadiene oligomers, allyl-capped polychloroprene oligomers, and allyl-capped polyester urethane oligomers. Similarly, vinyl-capped epoxy oligomers, vinyl-capped polyether oligomers, vinyl-capped urethane oligomers, vinyl-capped polyether oligomers, vinyl-capped polyester oligomers, vinyl-capped polybutadiene oligomers, vinyl-capped polychloroprene oligomers, and vinyl-capped polyester urethane oligomers. Further, oligomers capped in whole or in part with other vinyl containing functional groups, such as itaconate-capped oligomers, or those capped with acryloxypropionic acid, can also be used.

In general, suitable oligomers for use in the composition of the present invention are those which can be radiatively cured to provide tough, flexible films.

The radiatively curable composition of the present invention also preferably includes at least one reactive diluent for the at least one oligomer. The reactive diluent tends to react with the oligomer during cure and becomes a part of the cured mold. The reactive diluent can be an ethylenically unsaturated monomeric species which is copolymerizable with the oligomer during cure of the molding composition. The reactive diluent can be monofunctional or polyfunctional. Mixtures of reactive diluents, including mixtures of monofunctional and polyfunctional reactive diluents, can be used. The reactive diluent tends to lower the viscosity of the fluid molding composition, especially when the fluid composition is being applied to the model, so that the composition will flow easily over the surface of the model. The proportion of reactive diluent used in the fluid molding composition depends on a number of factors such as the initial viscosity of the oligomer, the compatibility of the reactive diluent and the oligomer in the molding composition, the glass transition temperature of a homopolymer of the reactive diluent, et al. However, in general, the reactive diluent comprises from about 5 to 55 percent, and preferably from about 15 to 35 percent, by weight of the total weight of the reactive diluent and oligomer.

Examples of monofunctional ethylenically unsaturated reactive diluents include aromatic compounds such as styrene and substituted styrenes including alpha-methyl styrene, p-methyl styrene, p-chlorostyrene, and the like, vinyl toluene, vinyl naphthalene, vinyl carbazole, 2-vinyl and 4-vinyl pyridine, and the like; vinyl ethers and thioethers such as vinyl alkyl ethers including vinyl butyl ether, vinyl ethyl ether, vinyl octyl ether, vinyl dodecyl ether, vinyl hydroxyethyl thioether, and vinyl tetradecyl thioether; other vinyl ethers such as vinyl phenyl ether, vinyl benzyl ether and vinyl cyclohexyl ether, and allyl vinyl ether; vinyl esters of saturated aliphatic acids having 1–18 carbon atoms such as vinyl acetate, vinyl laurate and vinyl stearate; vinyl halides such as vinylidene chloride; and lower alkenes.

Further examples include lower alkyl (having 1–18 carbon atoms) acrylates and methacrylates such as methyl methacrylate, ethyl acrylate, n-butyl acrylate, n-propyl acrylate, isobutyl acrylate, cyclohexyl acrylate, isobornyl acrylate, and ethylhexyl acrylate, substituted acrylates and methacrylates such as 2-hydroxyethyl acrylate, 2-hydroxyethyl methacrylate, the hydroxypropyl acrylates and methacrylates, 2-methoxyethyl acrylate, 2-methoxy-ethyl methacrylate, 2-butoxyethyl acrylate, 2-phenoxyethyl acrylate, 2-(N,N-diethylamino)ethyl acrylate, 2-(N,N-diethyl-amino) methacrylate, tetrahydrofurfuryl methacrylate, isodecyl methacrylate, alpha-cyanoethyl acrylate, polypropyleneglycol monomethylmethacrylate, vinyl acetate, vinyl versatate, acryloxyacrylates and methacrylates; acrylonitrile and methacrylonitrile; polymerizable amides such as acrylamide and methacrylamide and their N-substituted derivatives such as N-methyl, N-dimethyl, N-octyl, N-dodecyl, N-cylcohexyl, N-phenyl, N-methyl-N-benzyl, N-butoxymethyl, N-(dimethylaminoethyl), and N-beta-cyanoethyl acrylamide and methacrylamide; methylolacrylamide, alkoxymethylacrylamides, and the like.

Additional examples include N-vinyl pyrrolidone and derivatives thereof such as 3-methyl-1-methyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 4,5-dimethyl-1-vinyl pyrrolidone, 5,5-dimethyl-1-vinyl pyrrolidone, 3,3,5-trimethyl-1-vinyl pyrrolidone, 4-ethyl-1-vinyl pyrrolidone, 5-ethyl-5-methyl-1-vinyl pyrrolidone, 3,4,5-trimethyl-3-ethyl-1-vinyl pyrrolidone, and the like; N-vinyl 2-oxazolidinone, and derivatives thereof; and the like.

In addition, nominally difunctional monomers which do not tend to homopolymerize can be used. Examples of such difunctional monomers include diacids such as maleic acid, fumaric acid, itaconic acid, and the like, as well as maleic anhydride. In addition, lower alkyl esters and half-esters of such diacids can be used including ethyl itaconate, dimethyl maleate, dimethyl fumarate, diethyl maleate, diethyl citraconate, diethyl chloromaleate and diethyl fumarate.

If desired, mixtures of reactive diluents, such as mixtures of lower alkyl (meth)acrylates, can be used.

Examples of polyfunctional ethylenically unsaturated reactive diluents include allyl acrylate, allyl methacrylate, glycidyl acrylate, glycidyl methacrylate, ethyleneglycol diacrylate, diethyleneglycol diacrylate, 1,3-butyleneglycol diacrylate, 1,4-butanediol diacrylate, tetraethyleneglycol dimethacrylate, pentaerythritol triacrylate, trimethylolpropane triacrylate, pentaerythritol tetramethacrylate, neopentylglycol dimethacrylate, dipentaerythritol monohydroxy pentaacrylate, hexafunctional polyester acrylate, such as available as Photomer ™ 5007 from Diamond Shamrock Corp., trimethylolpropane ethoxylate triacrylates, such as available as Photomer ™ 4149, and ethoxylated bis-phenol A diacrylates.

A presently preferred reactive diluent is N-vinyl pyrrolidone.

Instead of an oligomer and reactive diluent, one or more suitable copolymerizable monomers, or a mixture thereof, can be used. In this case, a polyol is also preferably included in the molding composition. For example, a mixture of mono- and polyethylenically unsaturated (meth)acrylic monomers can be employed. Preferably, the relative proportions of the monoethylenically unsaturated monomers and the polyethylenically unsaturated monomers, as well as the average functionality of the polyethylenically unsaturated monomers, are selected to provide a cured molding composition which is both tough and flexible. Examples of monoethyenically unsaturated monomers and polyethylenically unsaturated monomers which can be used, for example, in such mixtures, are given above. Hydroxypropyl methacrylate and trimethylolpropane trimethacrylate are employed in a presently preferred embodiment, along with a polyol.

The fluid molding composition of the present invention also preferably includes a thixotrope or a filler to impart a high viscosity, gel-like character, or paste-like consistency to the fluid molding composition under zero shear conditions. As used in the present specification and claims, a "fluid" molding composition is one useful in the process of the present invention, regardless of the rheological characteristics of the molding composition, and "fluid" is used to distinguish uncured molding composition from cured molding composition, such as that forming a mold.

Preferably, the nature and proportion of the thixotrope or filler are selected so that the resulting fluid composition will not flow substantially after a layer of fluid molding composition has been applied to the model and while the fluid molding composition is being radiatively cured. On the other hand, in the case of a fluid molding composition containing a thixotrope, the viscosity of the fluid molding composition should be significantly lower when the the composition is being sheared, as when the fluid composition is being applied to the model, so that the fluid composition will flow readily over the model surface. An example of a thixotrope which can be used is fumed silica, such as that commercially available from Cabot Corporation under the tradename Cab-O-Sil ® TS-720.

The radiatively curable composition of the present invention also preferably includes at least one plasticizer. The plasticizer serves both to reduce the viscosity and adjust the surface tension of the fluid molding composition so that the fluid molding composition can be easily applied to even a finely detailed surface of a model, and to flexibilize the cured molding composition so that the mold can be easily removed from both the model and from castings subsequently made using the mold. The plasticizer can be a monomeric or a polymeric plasticizer, and mixtures of two or more plasticizers can be used. Preferably, the plasticizer comprises from about 25 to 70 percent by weight of the fluid molding composition. Examples of monomeric plasticizers include the phthalate ester plasticizers such as dioctyl phthalate and benzyl butyl phthalate. Examples of polymeric plasticizers include polycaprolactone triols.

Preferably, the radiatively curable fluid molding composition includes an indicator which changes color to signal the depth of penetration of the radiation into the fluid molding compound. Examples of such indicators which can be used include methylene blue dye, phenosafranin, such as disclosed in U.S. Pat. No. 3,773,706, and dyes such as Basic Blue 26, 15, 18, 20, etc.

Additionally, the radiatively curable molding composition can contain minor amounts of conventional additives, such as preservatives, surfactants, flow control agents, and the like. For example, a small amount of a white pigment such as titanium dioxide or barium sulfate can be added to enhance the visibility of the color of the depth of penetration indicator. Preferably, the amounts of such additives employed in the fluid molding composition are limited to substantially maintain the transparency of the fluid molding composition to the applied radiation.

A small amount of a surfactant such as Triton ® X-35 surfactant can be used to aid in dispersing added filler or thixotropes and/or to lower the surface tension of the fluid molding composition so that the surface of a finely detailed model can be reproduced with greater accuracy.

Preferably, the fluid molding composition is prepared by first gently warming the oligomer to about 110° F. and mixing the oligomer with the plasticizer, and subsequently mixing in the remaining components of the composition. Preferably, the thixotrope or filler is added last; the thixotrope or filler can be predispersed in a small amount of the fluid molding composition before addition to the bulk of the fluid composition.

The manner in which the fluid molding composition is used to make a flexible mold from a three-dimensional object or model depends on whether the fluid composition includes a thixotrope or filler. When no thixotrope or filler is employed the fluid molding composition has a low to moderate viscosity, and will flow even in the absence of an applied shearing force.

The minimum thickness of the initial layer is determined largely by the physical characteristics of the fluid molding composition, including its viscosity characteristics and surface tension. Preferably, the fluid molding composition is not so viscous so as to trap air bubbles when it is applied, nor so fluid so that many coats must be applied to build up a sturdy, servicable mold which can be used without tearing and without becoming distorted when filled with material to be molded. When the fluid molding composition has been suitably formulated, it can be applied in a single coat having a thickness of about one millimeter. A fluid molding composition which can be applied to give a coat of about one millimeter in thickness is generally suitable for capturing fine details in models such as medallions, art objects, decorative hardware, and the like.

The minimum thickness of the built-up multilayer of the cured molding composition is determined by a number of factors, including the characteristics of the cured molding composition. When the built-up multilayer is to be self-supporting, the minimum thickness of the built-up multilayer should be great enough so that the mold is reasonably strong so that the mold can support the weight of low to moderate density materials with which it is to be filled in making a casting without perceptible distortion. Low to moderate density materials are materials such as wax and plaster, which have densities from about 0.8 g/cm$^3$ to about 3.5 g/cm$^3$, and are to be contrasted with high density materials such as metals having densities greater than about 3.5 g/cm$^3$. Perceptible distortion is a lack of faithfulness to the original which can be readily discerned by an ordinary observer. Similarly, the mold must be thick enough so that it will not be damaged by the stretching and flexing required to remove the mold from a molded object.

Flexible molds made from large bas-relief models can be adequately supported during the casting of reproductions, through the use of the so-called "mother mold" system, as practiced in the state of the art. A finished flexible mold is placed back unto the model from which it was produced. A dam is placed around them and sealed to a base plate. Plaster is then poured into the dam to cover the highest part of the mold. When the plaster has set the resulting plaster "mother mold" is removed and allowed to dry. In use, the plaster cast is placed open side up, and the flexible mold is placed in position inside the cast plaster. This method allows the heavy castings of large parts to be produced from light weight flexible molds which have a built-up multilayer which is relatively thin.

Preferably, the minimum thickness of the built-up multilayer is at least about 3-4 millimeters.

There are several ways to produce a one-piece or bas-relief mold from the radiant cured mold making materials described herein. The first method makes use of the clear liquid formula, that does not contain a thixotropic agent or filler.

In this method, first the model is secured to a base plate, and then is surrounded by a dam which is sealed to the base plate to prevent leakage. Next, the model is given a thin (about 1 mm thick) brush coating of fluid molding composition to prevent air pockets from forming, and the model so coated is exposed to uv radiation to cure the thin coating of fluid molding composition. When the thin layer has been cured, more fluid molding composition is poured inside the dam to cover the model and exposed for a period adequate to cure the additional fluid molding composition. When the completed mold has been cured, the outer surface of the mold is wiped with alcohol to remove any uncured material at the surface and the dam and model are removed. This finished mold can then be used to cast duplicate models in wax for investment casting models, in plaster, in metal-filled epoxy, or in low melting alloys. Molds up to 1¼ inches thick can be cured in five minutes.

The molds made from this radiant cured flexible mold material possess "elastic memory." When stress is applied, this material bends, but after the stress is removed, the mold will return to its original cast shape without distortion.

Due to this ability to retain size upon curing this radiant cured mold is capable of reproducing precise duplicates of master models required by dental laboratories for precision investment casting.

Another type of one-piece mold that can be made with this radiant cured mold material is the "open-face mold." This type of mold uses a flexible molding making material that contains a thixotropic agent, to provide a paste-like rheology to the fluid molding composition. When this material is used, the base mounted model is given a thin brush coating (about 1 mm thick) and exposed to uv radiation to cure the thin brush coating. When cured, the model is then given thicker (2-3 mm) coats of the same material to build up the outer shell to at least about 5 mm thickness to form an open-face mold around at least portions of the model.

After having been built up to the desired thickness, and cured, the outer surface of the mold is wiped with alcohol and dried off. Once the model is released from the mold, the mold can then be used to cast duplicate models in wax for investment casting, or hydrostone, epoxy, low melt alloys, etc.

Another process in which the fluid molding composition can be used provides two-piece molds from models "in the round," as opposed to bas-relief or single sided models.

For example, using a three-dimensional model, mounted on a base plate, a parting line is marked that will divide two halves of the finished mold. A wall of a plastic material such as modeling clay is built up on the model at the parting line all around the model, extending at least one inch from the surface of the model. Grooves can be cut into one side of the wall to provide male members for subsequently positioning the two halves of the completed mold relative to one another. One side of the model and the face of the wall with the incised grooves are given a thin brush coating (about 1 mm) with a fluid molding composition containing a thixotropic agent, and this layer is uv cured. Thicker layers (2-3 mm) of the fluid molding composition are then applied to the prior coated areas and each additional coating is radiatively cured until the desired mold thickness is achieved.

When the first half of this two-part mold is completed, the wall is removed, but the model is not removed from the mold. The outer surface of the model and completed first mold half are wiped with alcohol and dried off. A sealcoating material such as zein solution is now applied to the cured first mold half to prevent contact with uncured fluid molding composition that will be applied to form the second half of the mold.

The now exposed half of the model and the sealcoated end of the first mold half at the parting line are given a thin brush coating of the thixotropic fluid molding composition used to produce the first half of the mold and the coating is uv cured. Additional thicker (2-3 mm) coats are applied with a spatula, and cured, to match the same thickness as the first half of the mold. When completed, the exterior surface of the mold is wiped with alcohol and dried off. The model is then removed from mold.

To use the mold so formed, the two halves of the mold are placed together, clamped, and inverted. Casting material can then be poured into the open end of the inverted mold.

If the fluid composition includes a thixotrope or filler, the fluid molding composition can be applied to the surface of the model under a shearing force, such as that exerted using a brush or by a spray apparatus. For example, if desired automated robotic spray apparatus of the type employed in the mass production of sprayed coatings in the automotive industry can be used to apply a uniform coating of the fluid composition to the model.

Preferably, the paste-like molding composition is in this case applied as a roughly uniform layer having a minimum thickness of about one millimeter, and the applied molding composition layer is subsequently cured by exposure to a source of radiant energy effective to cure the composition. Inclusion of a thixotrope may tend to reduce the clarity of the molding composition, depending on the particle size and concentration of the thixotrope particles employed, and the molding composition may tend to become translucent rather than transparent. Addition of an indicator dye is especially desirable when successive layers of molding composition are to be applied, as the presence of the indicator is very helpful in distinguishing portions of the surface which have been coated with a desired thickness of molding composition from those coated with less than the desired thickness, and for readily visually distinguishing cured molding composition (white color) from uncured molding composition (blue color), since the strength and depth of color increases with the thickness of the uncured coating.

If desired to enhance the strength and durability of the mold, additional layers of cured molding composition can be built up on the surface of the mold by alternately applying a layer of molding composition and subsequently curing the new, outermost layer by exposure to a source of effective radiant energy.

In addition, the strength and durability of the mold can be enhanced by providing at least one reinforcing web. It is desirable to coat the last cured layer on the model with uncured molding composition, embed the web therein, and subsequently apply another layer of uncured molding composition over the web before these two layers of uncured molding composition are cured.

Suitable reinforcing webs include woven and nonwoven webs; such web can be formed of synthetic resin fibers, such as nylon fibers and the like, or from inorganic fibers, such a graphite or glass fibers.

If the model has at least one generally flat surface, as is often the case in the the production of cast medallions, the model can be placed directly on a base member. The resulting mold has one open side and can be simply peeled away from the base member. The mold can then be inverted and filled with molding composition while open or it can be covered with a plate, such as a plate having a mold filling opening or channel, and optionally having suitable air-release openings or channels, machined therein to facilitate subsequent use of the mold.

For some applications, such as to obtain certain decorative effects in the ceramic arts, it is desirable to prepare a "negative" model rather than a "positive" model. In such cases a positive mold can be first prepared from the negative model using the process and composition of the present invention, and the positive mold so produced can be subsequently employed as a model for a negative mold.

In general, a single fluid molding composition of the present invention can be used to produce negative or positive molds. Flexible parts can be cast from either one using the same composition. Positive molds, or parts cast from negative molds, can be used to make negative plaster molds for duplicating parts used in producing ceramic articles.

When a mold has been built up to the desired thickness, it can be used immediately for casting duplicate reproductions of (castings or moldings) of the original three-dimensional object or model. A wide variety of materials can be cast or molded in the mold formed by the process of the present invention. Non-limiting examples of materials which can be molded include wax for use in lost wax or investment casting processes, plaster, and curable or polymeric materials, such as two-part epoxies, two-part urethanes, two-part acrylics, two-part silicones and the like, and thermoplastic polymeric materials.

The articles produced from molds prepared using the process of the present invention can be employed for a wide variety of purposes. For example, the finely detailed metal pieces produced from the lost wax process as noted above can be used as conductive electrodes in the process of making steel dies by the method of "electric discharge machining" (EDM). Similarly, hydrostone castings can be prepared for subsequent use as is or as intermediate "positives" in the metal spin casting process. Further, hot stamping fixtures can be cast and cured around oddshaped parts to hold them in position during the application the hot stamping foil, through the use of the present invention. Flexible molds can be produced from models made of metal, wood, plastic, plaster, wax or clay and after curing can be used to cast flexible parts. The exterior of the mold is first coated with "zein" solution and air-dried. Then the same mold composition that was used to make the flexible mold is poured into the mold and cured under black light tubes for five minutes. When cured the part is removed from the mold and can serve as a flexible prototype part in the designing of equipment.

The following examples are illustrative of the process and composition of the present invention and will be useful to one of ordinary skill in the art in practicing the invention. However, the invention is in no way limited by these examples.

EXAMPLE 1

A radiatively curable fluid molding composition containing no thixotrope is prepared by gently mixing together the following components in the indicated proportions:

| Component | Weight % |
| --- | --- |
| acrylate-capped polyester urethane oligomer[1] | 36.93 |
| butyl benzyl phthalate[2] (plasticizer) | 40.62 |
| N-vinyl pyrrolidone[3] (reactive diluent) | 12.92 |
| polyethoxylated octylphenol[4] (surfactant) | 0.27 |
| polycaprolactone triol[5] (plasticizer) | 7.38 |
| 2-hydroxy-2-methyl-1-phenylpropan-1-one[6] (initiator) | 1.88 |
| | 100.00 |

[1]Uvithane ® 782 oligomer available from Morton Thiokol, Inc. Morton Chemical Division.
[2]Santicizer ® 160 plasticizer available from Monsanto Co. 800 N. Lindbergh Blvd., St. Louis, MO 63166.
[3]Amine-stabilized monomer available as Product No. 84332 from BASF Corporation, Chemicals Division, Parsippeny, NJ 07054
[4]Triton ® X-35 surfactant available from Rohm and Haas Company, Independence Mall West, Philadelphia, PA 19105
[5]Tone ® Polyol 0305 polyols available from Union Carbide Corp., Solvents & Coatings Materials Div., 39 Old Ridgebury Road, Danbury, CT 06817 (average molecular weight = 540)
[6]Darocur ® 1173 photoinitiator available from EM Chemicals, 5 Skyline Drive, Hawthorne, NY 10532

The resulting fluid molding composition is slightly yellow and transparent.

A bas-relief wax model was secured to a flat base plate and surrounded by a thin metal dam at about one quarter of an inch distance from the model. The base of the dam was sealed to the base plate with modeling clay to prevent leakage of fluid mold making material. Then the model was given a thin (about 1 mm thick) brush coating of fluid mold making material to prevent air pockets from forming at the surface of the model. The coated model was next placed about four inches below a fixture containing two, eight watt "black light" tubes for an exposure of three minutes. A suitable fixture fitted with two eight watt "black light" tubes is available from American Ultraviolet Co., Murray Hill, N.J. 07974. When the thin layer had been cured, more fluid mold material was poured inside the dam and flowed slowly over the model. The dam was filled to about one quarter of an inch over the model. The model surrounded by the filled dam was placed under the fixture and exposed for five minutes. When the completed mold was cured, the top surface of the mold was wiped with alcohol, and the dam and model were removed. This finished radiant cured mold could then be used to cast duplicate models in wax for investment casting models, in plaster, in metal-filled epoxy, or in low melting alloys. Molds up to 1¼ inches thick could be cured in five minutes. The mold possessed "elastic memory." When stress was applied, the mold would bend, but after the stress was removed, the mold would return to its original cast shape without distortion.

EXAMPLE 2

A radiatively curable fluid molding composition containing a thixotrope is prepared by gently mixing together the following components in the indicated proportions:

| Component | Weight % |
| --- | --- |
| acrylate-capped polyester urethane oligomer[1] | 36.76 |
| butyl benzyl phthalate[2] (plasticizer) | 40.44 |
| N-vinyl pyrrolidone[3] (reactive diluent) | 12.86 |
| polyethoxylated alkylphenol[4] (surfactant) | 0.27 |
| polycaprolactone triol[5] (plasticizer) | 7.35 |
| 2-hydroxy-2-methyl-1-phenylpropan-1-one[6] (initiator) | 1.83 |
| fumed silica[7] (thixotrope) | 0.48 |
| indicator dye[8] (indicator) | 0.01 |
| | 100.00 |

[1]Uvithane ® 782 oligomer available from Morton Thiokol, Inc. Morton Chemical Division.
[2]Santicizer ® 160 plasticizer available from Monsanto Co. 800 N. Lindbergh Blvd., St. Louis, MO 63166.
[3]Amine-stabilized monomer available as Product No. 84332 from BASF Corporation, Chemicals Division, Parsippeny, NJ 07054
[4]Polystep ® F-10 surfactant available from Stepan Chemical Co. Northfield, IL 60093.
[5]Tone ® Polyol 0305 polyols available from Union Carbide Corp., Solvents & Coatings Materials Div., 39 Old Ridgebury Road, Danbury, CT 06817 (average molecular weight = 540)
[6]Darocur ® 1173 photoinitiator available from EM Chemicals, 5 Skyline Drive, Hawthorne, NY 10532
[7]Cab-O-Sil ® TS-720 available from Cabot Corp., Tuscola, IL 61953.
[8]Basic Blue 26 indicator dye, available from Atlantic Chemical Company, Nutley, NJ 07110.

The resulting fluid molding composition is light blue in color, slightly translucent, and paste-like in consistency.

One type of one piece mold that can be made with this radiant cured molding composition is the partial "shell-mold." This composition does not require a dam be formed around the model. When this molding composition is used, the base-mounted model is given a thin brush coating (about 1 mm thick) and exposed, four inches below the fixture containing two eight watt black light tubes, for three minutes. When cured, the model is then given thicker (2-3 mm) coats of the same fluid molding composition to build up the outer shell to about 5 mm thickness.

After having been built up to the desired thickness, and cured, the surface of the mold is wiped with alcohol and dried off. Once the model is released from the mold, it is ready to be used to cast duplicate models in wax for investment casting, hydrostone epoxy, low melt alloys, etc.

EXAMPLE 3

A finely detailed, bas-relief clay model is mounted on a base plate and coated with zein solution or tincture of green soap from C.M.C. Inc. of Nashville, Tenn. 37202. Next, a thin (about one millimeter thick) coat of the resulting bluish, translucent fluid molding composition is applied to the surface of the model by brush, extending about an inch around the base of the model. Application of the initial coat of fluid molding composition by brush is preferred, as the fine detail of the model can be easily captured, since bridging over of incised areas and the formation of air pockets in deep recesses of the model can be avoided. After the initial coat has been applied, the model is placed about twelve inches away from and under a mercury vapor discharge lamp (Porta-Cure 100 American Ultraviolet Company—365 nm output) for about three minutes, until the color of the coating has changed from blue to white. Next, a second layer or coat of fluid molding composition is brushed on the cured surface of the initial molding composition layer surrounding the model. The uncured fluid composition is blue in color and can be easily distinguished from the cured molding composition which is white in color so that a substantially uniform second coat of the fluid molding composition can be applied. The second thicker coat is exposed to the uv source until cured. The process of coating the model coated with the previously cured molding composition with an additional coat of fluid molding composition and subsequently curing the fluid molding composition is repeated until a predetermined minimum mold thickness is attained, approximately five to seven millimeters. The model is immediately removed from the mold by flexing the mold away from the model and the empty mold is positioned so that the open side of the mold is facing up. The mold is then filled with a molten wax composition of the type used in the lost wax casting process, the molten wax being dispensed from conventional apparatus, and the wax is permitted to cool in the mold. The solidified wax model is subsequently removed and used to cast a finely detailed reproduction of the original model in a precious metal by the lost wax process.

EXAMPLE 4

Using an "in-the-round" model, mounted on a base plate, a parting line is marked that divides the two halves of the finished mold. A wall of modeling clay is applied to the model at the parting line all around the model. This wall should extend at least an inch or more at right angles to the model. Incised grooves are cut into the flat surface of this wall, facing the side to be first coated with the fluid molding composition. This first half of the model to be coated, and the face of this wall with the incised grooves are all given a thin brush coating (about 1 mm) with the fluid molding composition of Example 2. The coated model is then placed 12 inches in front of a Porta-Cure ™ 100 ultraviolet lamp available from American Ultraviolet Co., Murray Hill, N.J. 07974 for a 3 minute exposure. On curing, thicker layers (2-3 mm) are applied to all prior coated areas and each additional coating is given a 5 minutes exposure under the "Porta Cure" lamp. These coatings are added to build up to reach a final shell thickness of at least about one quarter of an inch.

When the first half of this two-part mold is completed, the clay wall is removed, but the model is not removed from the mold. The series of thick coatings that are applied to the clay wall and the first half of the model will have been cured to form a duplicate wall that is attached to the model, and extends to the parting line. The exterior surfaces of the mold and the face of this cured wall are wiped with alcohol and dried off. A sealcoating material, Hydrolite ™ zein solution available from Freeman Industries, Inc., Tuckahoe, N.Y. 10707, is now applied to the face of the cured wall to prevent contact with the uncured fluid molding composition that is to be applied to form the second half of the mold. This barrier coating is brushed on the face of the cured wall and force air-dried.

The model and the sealcoated wall are given a thin brush coating of same thixotrope-filled fluid molding composition used to produce the first half of the mold. The fluid molding composition on the second half of the model is cured for three minutes, with the same Porta-Cure lamp 12 inches away from the mold. Additional, thicker (2-3 cm) coats are applied with a spatula, exposing each coating for 5 minutes, to match the same thickness as the first half of the mold. When completed, the exterior surface of the mold is wiped with alcohol and dried off. The model is then removed from the mold and the mold can then be used to cast duplicates of the model.

EXAMPLE 5

A radiatively curable fluid molding composition including a thixotrope is prepared by gently mixing together the following components in the indicated proportions:

| Component | Weight % |
|---|---|
| hydroxypropyl methacrylate[1] (monofunctional monomer) | 39.86 |
| trimethylolpropane trimethacrylate[2] (polyfunctional monomer/crosslinker) | 0.64 |
| 2-hydroxy-2-methyl-1-phenylpropan-1-one[3] (initiator) | 2.00 |
| polyester polyol[4] (plasticizer) | 52.00 |
| barium sulfate[5] (white pigment) | 1.00 |
| fumed silica[6] (thixotrope) | 4.00 |
| indicator dye[7] (indicator) | 0.50 |
| | 100.00 |

[1]Rocryl ® 410 monomer available from Rohm and Haas Company, Independence Mall West, Philadelphia, PA 19105
[2]SR-350 available from Sartomer Co. Westchester, PA.
[3]Darocur ® 1173 photoinitiator available from EM Chemicals, 5 Skyline Drive, Hawthorne, NY 10532
[4]R-1115-12W available from Witco Co. Organics Div., Elkton, MD 19720
[5]Fisher Scientific Co., King of Prussia, PA 19406
[6]Cabosil ® TS-720 available from Cabot Corp., Tuscola, IL 61953.
[7]Methylene blue dye, available from Atlantic Chemical Corp., Nutley, NJ 07110.

The resulting paste-like molding composition is light blue in color.

The process of Example 3 is repeated to produce a flexible mold for a bas-relief model using this molding composition.

EXAMPLE 6

A radiatively curable fluid molding composition containing a mixture of oligomers and no thixotrope is prepared by gently mixing together the following components in the indicated proportions:

| Component | Weight % |
|---|---|
| acrylate-capped polyester urethane oligomer[1] | 33.89 |
| butyl benzyl phthalate[2] (plasticizer) | 35.59 |
| N-vinyl pyrrolidone[3] (reactive diluent) | 7.00 |
| polyethoxylated alkylphenol[4] (surfactant) | 0.27 |
| polyether polyols[5] (plasticizer) | 6.54 |
| acrylated polybutadiene oligomer[6] | 15.00 |
| 2-hydroxy-2-methyl-1-phenylpropan-1-one[7] (initiator) | 1.71 |
| | 100.00 |

[1]Sartomer ® 9503 "Monomer," a difunctional aliphatic acrylated urethane oligomer (molecular weight 2000). Available from Sartomer Company, a division of Pony Industries. Bolmar and Nields Streets, West Chester, PA 19382.
[2]Santicizer ® 160 plasticizer available from Monsanto Co. 800 N. Lindbergh Blvd., St. Louis, MO 63167
[3]Amine-stabilized monomer available as V-Pyrol (amine stabilized) from GAF Chemicals Corp., 1361 Alps Road, Wayne, NJ 07470.
[4]Triton ® X-35 surfactant, an octylphenoxypolyethoxyethanol, available from Rohm and Haas Co.
[5]Pluracol ® Polyol 975 polyols available from BASF Wyandotte Corporation, 100 Cherry Hill Road, Parsippany, NJ 07054.
[6]Ricon ® PBD-acrylated oligomer, available from Colorado Chemical Specialties, Golden, CO 80403.
[7]Darocur ® 1173 photoinitiator available from EM Chemicals, 5 Skyline Drive, Hawthorne, NY 10532

The resulting fluid molding composition is slightly yellow and transparent. The process of Example 1 is repeated to produce a flexible mold using this molding composition.

Various modifications can be made in the details of the various embodiments of the processes and compositions of the present invention, all within the spirit and scope of the present invention as defined by the appended claims.

I claim:

1. A process for rapidly forming a multilayer flexible mold for finely detailed objects from a radiatively curable molding composition, the process comprising:
   (a) coating at least a portion of the surface of a three-dimensional object with a fluid molding composition, the molding composition being radiatively curable;
   (b) curing the coating to form an elastic, flexible layer of cured molding composition on the three-dimensional object by exposing the fluid coating composition to radiative energy;
   (c) repeating steps (a) and (b) successively until a self-supporting multilayer elastic coating of cured molding composition has been formed on the three-dimensional object, the multilayer coating being sufficiently strong so as to not distort perceptibly when filled with a molding material having a low to moderate density; and
   (d) removing the three-dimensional object.

2. A process according to claim 1 wherein the fluid molding composition applied in step (a) is applied in a coating having at least a first predetermined thickness, and steps (a) and (b) are repeated until an elastic layer of cured molding composition having at least a predetermined second, minimum, thickness has been formed on the three-dimensional object.

3. A process according to claim 1 wherein the second predetermined thickness is about 3-4 millimeters, and the cured elastic layer is suitable for use as a mold.

4. A process according to claim 2 wherein the predetermined first thickness is about one millimeter, and the predetermined second thickness is about 3-4 millimeters.

5. A process according to claim 1 wherein the radiatively curable fluid molding composition includes an indicator which changes color to signal the depth of penetration of light.

6. A process according to claim 1 wherein the fluid molding composition comprises:
   (a) at least one crosslinkable oligomer;
   (b) at least one reactive diluent; and
   (c) at least one photoinitiator.

7. A process according to claim 6 wherein the at least one oligomer is selected from the group consisting of (meth)acrylate-capped epoxy oligomers, (meth)acrylate-capped polyether oligomers, (meth)acrylate-capped polyester oligomers, (meth)acrylate-capped polybutadiene, (meth)acrylate-capped polychloroprene, (meth)acrylate-capped polyester urethane oligomers, (meth)acrylate-capped polybutadiene oligomers, (meth)acrylate-capped nylon oligomers, (meth)acrylate-capped polysulfide oligomers, (meth)acrylated polybutadiene oligomers, and polychloroprene oligomers.

8. A process according to claim 7 wherein the at least one oligomer is an acrylate-capped oligomer having an average acrylate functionality of about two.

9. A process according to claim 8 wherein the at least one oligomer is an acrylate-capped polyester urethane oligomer.

10. A process according to claim 9 wherein the at least one oligomer has a number-average molecular weight of at least about 500.

11. A process according to claim 10 wherein the acrylate-capped polyester urethane oligomer has a number-average molecular weight of about 5000.

12. A process according to claim 6 wherein the at least one reactive diluent is a monoethylenically unsaturated monomer copolymerizable with the at least one crosslinkable oligomer.

13. A process according to claim 12 wherein the at least one reactive diluent is N-vinyl pyrrolidone.

14. A process according to claim 6 wherein the fluid molding composition additionally comprises at least one thixotrope.

15. A process according to claim 14 wherein the at least one thixotrope is fumed silica.

16. A process according to claim 6 wherein the fluid molding composition additionally comprises at least one plasticizer for the crosslinkable oligomer.

17. A process according to claim 16 wherein the at least one plasticizer includes butyl benzyl phthalate and at least one polycaprolactone polyol.

18. A process according to claim 2 additionally comprising providing at least one reinforcing web, embedding the reinforcing web in a layer of uncured of fluid molding composition, and curing the layer of fluid molding composition.

19. A process according to claim 1 wherein the fluid molding composition comprises:
   (a) at least one hydroxy-functional (meth)acrylate monomer,
   (b) at least one polyol;
   (c) at least one polyfunctional monomer reactive with the at least one hydroxy-functional (meth)acrylate monomer; and
   (c) at least one photoinitiator.

20. A process according to claim 19 wherein the at least one hydroxy-functional (meth)acrylate monomer is hydroxypropyl methacrylate, the at least one polyfunctional monomer being trimethylolpropane trimethacrylate.

21. A process for forming a multilayer flexible mold for finely detailed objects from a radiatively curable molding composition, the process comprising:
   (a) coating at least a portion of the surface of a three-dimensional object with at least a predetermined first thickness of a fluid molding composition, the molding composition being radiatively curable;
   (b) curing the coating to form an elastic, flexible layer of cured molding composition on the three-dimensional object by exposing the fluid coating composition to radiative energy for at least a predetermined period;
   (c) repeating steps (a) and (b) successively until an elastic coating of cured molding composition having at least a second predetermined thickness has been formed on the three-dimensional object; and
   (d) removing the three-dimensional object; the first predetermined thickness being about one millimeter, the predetermined second thickness being about 3-4 millimeters; the fluid molding composition comprising at least one crosslinkable oligomer, at least reactive diluent agent, at least one thixotrope, at least one plasticizer for the crosslinkable oligomer, and at least one photoinitiator;
   the at least one oligomer being selected from the group consisting of (meth)acrylate-capped epoxy oligomers, (meth)acrylate-capped polyether oligomers, (meth)acrylate-capped polyester oligomers, (meth)acrylate-capped polybutadiene, (meth)acrylate-capped polychloroprene, (meth)acrylate-capped polyester urethane oligomers, (meth)acrylate-capped polybutadiene oligomers, (meth)acrylate-capped nylon oligomers, (meth)acrylate-capped polysulfide oligomers, (meth)acrylated polybutadiene oligomers, and polychloroprene oligomers.

* * * * *